United States Patent
Lekse et al.

(10) Patent No.: US 11,176,743 B2
(45) Date of Patent: Nov. 16, 2021

(54) PORTABLE DEVICE FOR RENDERING A VIRTUAL OBJECT AND A METHOD THEREOF

(71) Applicant: SIGNIFY HOLDING B.V., Eindhoven (NL)

(72) Inventors: Dominika Lekse, Eindhoven (NL); Ralf Gertruda Hubertus Voncken, Eindhoven (NL); Edith Danielle Den Hartog, Eindhoven (NL); Bram François Joosen, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 189 days.

(21) Appl. No.: 16/489,467

(22) PCT Filed: Feb. 21, 2018

(86) PCT No.: PCT/EP2018/054271
§ 371 (c)(1),
(2) Date: Aug. 28, 2019

(87) PCT Pub. No.: WO2018/158123
PCT Pub. Date: Sep. 7, 2018

(65) Prior Publication Data
US 2021/0142565 A1 May 13, 2021

(30) Foreign Application Priority Data

Feb. 28, 2017 (EP) ..................................... 17158454

(51) Int. Cl.
*G06T 19/00* (2011.01)

(52) U.S. Cl.
CPC .................................. *G06T 19/006* (2013.01)

(58) Field of Classification Search
CPC ....... G06T 19/006; G06T 15/00; G06T 19/00; G02B 27/01; G06F 17/30; G06F 3/01; G06F 9/5072; G06F 3/04817; G09G 5/00; G09G 3/00; H04W 4/029; H04W 4/021; H04W 4/80; G06K 9/00664;
(Continued)

(56) References Cited

U.S. PATENT DOCUMENTS 9,342,929 B2    5/2016  Kamuda et al.
2010/0141514 A1*  6/2010  Bell .................... G01S 5/0027
                                                        342/357.31
(Continued)

FOREIGN PATENT DOCUMENTS

EP           2466886 A1    6/2012

*Primary Examiner* — Xilin Guo (57) ABSTRACT

A method (400) of rendering a virtual object on a portable device is disclosed. The method (400) comprises: accessing (402) a user schedule comprising scheduled locations of a user corresponding with scheduled moments in time, comparing (404) a current moment in time with the scheduled moments in time to select (406) a scheduled location corresponding with one of the scheduled moments in time that corresponds with the current moment in time, obtaining (408) a location of the portable device (100), and rendering (410) the virtual object on an image rendering device (102) of the portable device (100) only if the location of the portable device (100) corresponds with the selected scheduled location.

12 Claims, 4 Drawing Sheets

(58) Field of Classification Search
CPC ......... G06K 9/00671; G06Q 10/06311; G06Q 10/10; G06Q 10/02
See application file for complete search history.

(56) References Cited

U.S. PATENT DOCUMENTS

| | | |
|---|---|---|
| 2013/0342564 A1 | 12/2013 | Kinnebrew et al. |
| 2014/0163861 A1* | 6/2014 | Beaurepaire ........... G01C 21/00 701/400 |
| 2014/0282274 A1 | 9/2014 | Everitt et al. |
| 2015/0052534 A1 | 2/2015 | Wang et al. |
| 2015/0205894 A1 | 7/2015 | Faris et al. |
| 2016/0299563 A1 | 10/2016 | Stafford et al. |
| 2016/0337827 A1 | 11/2016 | Bjontegard |
| 2018/0053351 A1* | 2/2018 | Anderson ............... G06F 3/011 |

\* cited by examiner

PORTABLE DEVICE FOR RENDERING A VIRTUAL OBJECT AND A METHOD THEREOF

CROSS-REFERENCE TO PRIOR APPLICATIONS

This application is the U.S. National Phase application under 35 U.S.C. § 371 of International Application No. PCT/EP2018/054271, filed on Feb. 21, 2018, which claims the benefit of European Patent Application No. 17158454.3, filed on Feb. 28, 2017. These applications are hereby incorporated by reference herein.

FIELD OF THE INVENTION

The invention relates to a method of rendering a virtual object on a portable device and to a computer program product for executing the method. The invention further relates to a portable device for rendering a virtual object.

BACKGROUND

Recent developments in virtual reality (VR) and augmented reality (AR) enable a user to interact with virtual objects. These virtual objects may be displayed as an overlay on top of the physical world, for example on a smartphone or on AR-goggles. U.S. patent application 2013/0342564 A1 discloses such a display apparatus for creating and displaying virtual environments based on real world source environments. This technology enables many different types of applications, for example position-based treasure hunt games. When playing such a game, a user may move through the physical world in order to 'hunt' (seek) virtual treasures. Such games may be addictive, and may result in that users neglect their daily commitments.

SUMMARY OF THE INVENTION

It is an object of the present invention to attract people to certain locations.

According to a first aspect of the present invention, the object is achieved by a method of rendering a virtual object on a portable device, the method comprising:
  accessing a user schedule comprising scheduled locations of a user corresponding with scheduled moments in time,
  comparing a current moment in time with the scheduled moments in time to select a scheduled location corresponding with one of the scheduled moments in time that corresponds with the current moment in time,
  obtaining a location of the portable device, and
  rendering the virtual object on an image rendering device of the portable device only if the location of the portable device corresponds with the selected scheduled location.

The virtual object is only rendered when the user is at a location that corresponds with a scheduled location of the user schedule of that user. Thus, when a user is present at a location that does not match his or her user schedule, the virtual object will not be rendered. This results in that a user is required to be at the scheduled location in order to see the virtual object, thereby attracting the user to the scheduled location. For instance, a child may be playing an AR treasure hunt game. The user schedule of the child may comprise a scheduled location (e.g. the bedroom) associated with a scheduled time (e.g. 08:00 PM). When it is time to go bed (08:00 PM), a virtual object (e.g. a virtual character) may no longer be rendered when the portable device (and therewith the child) is located in the living room. Thus, in order to see the virtual object, the child will have to move the portable device to the scheduled location (the bedroom). This attracts the child to the bedroom. In another example, an employee may want to access virtual content in an office. The user schedule of the user may comprise a scheduled location (e.g. a meeting room) associated with a scheduled time (e.g. 10:00 AM). The virtual object (e.g. a virtual presentation, a video, a document, etc.) may only be rendered when the portable device (and therewith the employee) is located in the meeting room. Thus, in order to see the virtual object, the employee will have to move the portable device to the scheduled location (the meeting room). This attracts the employee to the meeting room.

In embodiments, the virtual object is rendered on the image rendering device as an overlay on a physical environment wherein the portable device is located. The image rendering device may for example be a display, and the portable device may comprise an image capturing device configured to capture images. The method may further comprise the steps of rendering the images captured by the image capture device on the display, and rendering the virtual object on the display as an overlay on the images. Alternatively, the portable device may be a pair of smart glasses, and the image rendering device may be a projector configured to project the virtual object on at least one of the glasses of the pair of smart glasses as an overlay on a physical environment wherein the portable device is located. The method may further comprise projecting the virtual object on at least one of the glasses of the pair of smart glasses as an overlay on the physical environment wherein the portable device is located. It should be noted that these techniques of rendering virtual objects as an overlay on the physical environment are mere examples, and that the skilled person will be able to design alternatives without departing from the scope of the appended claims.

In embodiments, the method further comprises comparing a future moment in time with the scheduled moments in time to select a future scheduled location corresponding with one of the scheduled moments in time that corresponds with the future moment in time. Additionally, the method may further comprise providing a notification by the portable device indicative of that the future moment in time is approaching and/or that the virtual object will be rendered on the portable device at the future scheduled location. The notification (e.g. an indicator rendered on the image rendering device, a vibration of the portable device, turning on an indicator LED, an audio signal, etc.) notifies the user that the future moment in time is approaching and/or that the virtual object will be rendered on the portable device at the future scheduled location. This is beneficial, because it informs the user when/where the virtual object will be available. Additionally or alternatively, the method may further comprise changing a light output of a lighting device located in proximity of the future scheduled location to indicate that the virtual object will be rendered on the portable device at the future scheduled location. Changing the light output of a lighting device (e.g. blinking, changing the color of the light, etc.) located nearby the future scheduled location is beneficial because it informs the user where the virtual object will be available.

In embodiments, the method may further comprise:
  receiving a mapping of a virtual environment on the physical environment wherein locations in the virtual environment correspond to locations in the physical environment, rendering the virtual object on the image rendering device at a first virtual location in the virtual environment corresponding to a first physical location in the physical environment, and setting the virtual object to a movement state, wherein the virtual object moves from the first virtual location to a second virtual location in the virtual environment corresponding to a second physical location in the physical environment, wherein the first physical location is the scheduled location corresponding with the current moment in time, and wherein the second physical location is the future scheduled location corresponding with the future moment in time. This provides the advantage that the user is able to see in which direction/to which future location the virtual object is moving. The virtual object may be set to the movement state between the current moment in time and the future moment in time. Alternatively, the virtual object may be set to the movement state at the future moment in time.

In embodiments, the method further comprises detecting a presence of a physical object located within a predetermined proximity of the portable device, wherein the rendering of the virtual object occurs only when the physical object is present. The physical object may, for example, be a toy, and the virtual object (e.g. a virtual character) may only be rendered if the presence of the toy is detected within a predetermined proximity of the portable device. Additionally, the method may comprise the step of determining a location of the virtual object on the image rendering device based on a location of the physical object. The virtual object may, for example be rendered in close proximity of the physical object. This may for example be advantageous if the virtual object provides information about the physical object. Alternatively, the virtual object may be rendered as an overlay on top of the physical object. This may be beneficial, because it may change the appearance of the physical object as seen by a user on the image rendering device of the portable device.

In embodiments, the method further comprises:
obtaining a plurality of locations of the portable device over a period of time, each user location corresponding with a moment in time, and at least one of:
generating the user schedule based on the plurality of user locations and the corresponding moments in time and storing the user schedule in the memory, and
determining a future location corresponding with a future moment in time by extrapolating the plurality of user locations and the corresponding moments in time. This enables creation of the user schedule based on previous movement/presence patterns of the user. Additionally or alternatively, this enables prediction of where and when the user will likely be located in the future.

According to a second aspect of the present invention, the object is achieved by a computer program product for a computing device, the computer program product comprising computer program code to perform any one of the above-mentioned methods when the computer program product is run on a processing unit of the computing device.

According to a third aspect of the present invention, the object is achieved by a portable device for rendering a virtual object, the portable device comprising:
an image rendering device configured to render virtual objects,
a processor configured to access a memory storing a user schedule comprising scheduled locations of a user corresponding with scheduled moments in time, and to compare a current moment in time with the scheduled moments in time to select a scheduled location corresponding with one of the scheduled moments in time that corresponds with the current moment in time, and to obtain a location of the portable device, and to render the virtual object on the image rendering device only if the location of the portable device corresponds with the selected scheduled location.

In embodiments, the image rendering device is a display, and the portable device further comprises an image capturing device configured to capture images, and the processor is further configured to render the images captured by the image capture device on the display, and to render the virtual object on the display as an overlay on the images. Alternatively, the portable device is a pair of smart glasses, and the image rendering device is a projector configured to project the virtual object on at least one of the glasses of the pair of smart glasses as an overlay on a physical environment wherein the portable device is located.

In embodiments, the portable device further comprises a location detector configured to detect the location of the portable device. Additionally, the location detector may be configured to determine the location of the portable device based on one or more location signals received from a positioning system. The location signals may, for example, comprise the exact location of the portable device as determined by the positioning system. Alternatively, the location signals may be sent by (indoor) positioning beacons, such as radio frequency (RF) beacons, and the location detector may be configured to determine the location of the portable device based on for example the signal strength of the location signals.

It should be understood that the claimed portable device may have similar and/or identical embodiments and advantages as the claimed method.

BRIEF DESCRIPTION OF THE DRAWINGS

The above, as well as additional objects, features and advantages of the disclosed portable devices, systems and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
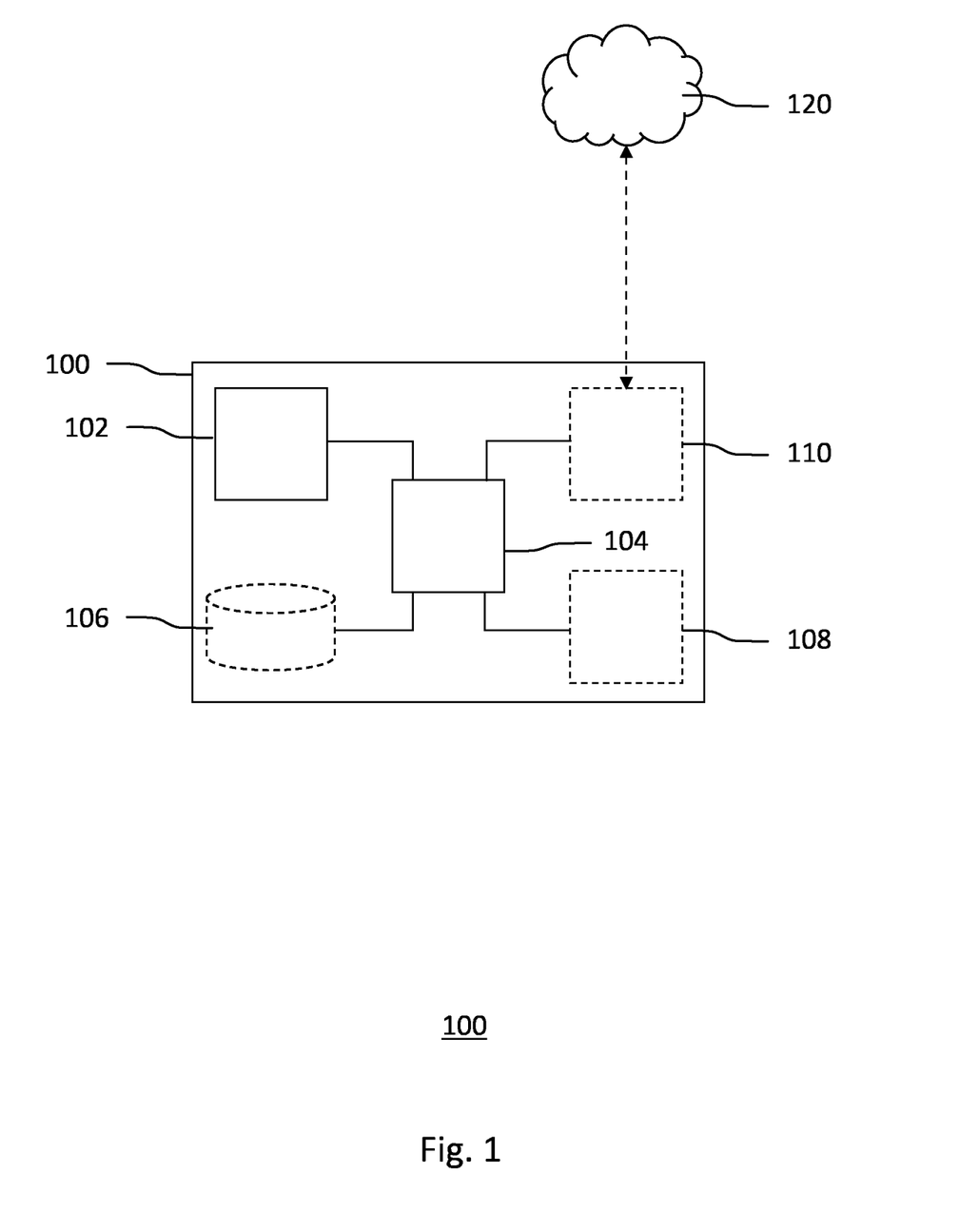
FIG. 1 shows schematically an embodiment of a portable device for rendering a virtual object.

FIG. 1 shows schematically an embodiment of a portable device 100 for rendering a virtual object. The portable device 100 comprises an image rendering device 102 configured to render virtual objects. The portable device 100 further comprises a processor 104 configured to access a memory storing a user schedule comprising scheduled locations of a user corresponding with scheduled moments in time. The processor 104 is further configured to compare a current moment in time with the scheduled moments in time to select a scheduled location corresponding with one of the scheduled moments in time that corresponds with the current moment in time. The processor 104 is further configured to obtain a location of the portable device 100, and to render the virtual object on the image rendering device 102 only if the location of the portable device 100 corresponds with the selected scheduled location.

The portable device 100 may be any type of portable device suitable to be taken along with the user and comprising an image rendering device 102. The portable device 100 may, for example, be a smartphone, a tablet pc, a laptop pc, etc. The portable device 100 may be a wearable device such as a pair of smart glasses, AR glasses, VR glasses, a smart watch, etc. The image rendering device 102 may be any type of means for rendering virtual objects such as images. The image rendering device 102 may, for example, be a display or a projector.

The processor 104 of the portable device 100 is configured to access a memory storing a user schedule comprising scheduled locations of a user corresponding with scheduled moments in time. The memory 106 may be located in the portable device 104. Alternatively, the memory may be located in a remote server 120, and the portable device 100 may further comprise a communication unit 110 configured to communicate with the remote server and access the memory in order to retrieve the user schedule. The user schedule may, for example, comprise a look-up table comprising associations between the scheduled locations and the scheduled moments in time. Table 1 illustrates an example of a lookup table of a user.

TABLE 1

| Time | Location |
|---|---|
| 06:00 PM-07:00 PM | Dining room |
| 08:00 PM-08:10 PM | Bathroom |
| 08:10 PM-08:30 PM | Bedroom |

The processor 104 is further configured to compare a current moment in time with the scheduled moments in time to select a scheduled location corresponding with one of the scheduled moments in time that corresponds with the current moment in time. For example, when referring to Table 1, if the current moment in time is 08:05 PM, the processor 104 may select the "Bathroom" location, because this location corresponds with the scheduled moment in time "08:00 PM 08:10 PM".

The processor 104 is further configured to obtain a location (e.g. a set of coordinates, an indicator indicating a room, etc.) of the portable device 100. The location of the portable device 100 and the scheduled locations may, for example, be indicated as a GPS location (e.g. a set of coordinates), an (indoor) locations relative to an area (e.g. coordinates in a room), an area within a space (e.g. sets of coordinates defining an area inside a room), room descriptors, etc. The processor 104 may, for example, comprise a location detector 108 configured to detect the location of the portable device 100. The location detector 108 may receive location signals from a positioning system. An example of such a positioning system is an (indoor) positioning system that uses a plurality of radio frequency (RF) beacons distributed throughout the space that may communicate with the location detector 108 in the portable device 100. The location detector 108 may for example be an RF transceiver/receiver arranged for transmitting and/or receiving RF signals to/from the beacons. The location of the portable device 100 relative to the location of the beacons may be calculated by using triangulation or trilateration based on for example the time-of-flight (TOF) of the RF signals received from the beacons, or based on the received signal strength of the RF signals received from the beacons. Additionally or alternatively, the location detector 108 may comprise a light sensor for detecting a coded light signal emitted by a light source of a luminaire. This at least one coded light signal may comprise (a link to) location information about the luminaire, thereby enabling the location detector 108 to determine its location. The code in the coded light may be created by any known principle of embedding a code in light, for example by controlling a time-varying, modulated current to the one or more light sources to produce variations in the light output, by modulating the amplitude and/or the duty-cycle of the light pulses, etc. The location may be determined in further detail based on a characteristic of the received coded light signal (e.g. based on the light intensity of the light, the signal/noise ratio of the signal, the angle of incidence of the light, etc.). It should be noted that the above-mentioned techniques for determining the location of the portable device 100 are merely examples, and that the skilled person will be able to design many alternatives without departing from the scope of the appended claims.

The processor 104 is further configured to render the virtual object on the image rendering device 102 only if the location of the portable device 100 corresponds with the selected scheduled location. For example, when referring again to Table 1, the processor 104 may determine that the portable device 100, and therewith the user, is located in the bathroom at 08:05 PM, and therefore determine to render the virtual object on the image rendering device 102 of the portable device 100.

The virtual object may be any type of virtual object. Examples of virtual object include but are not limited to inanimate objects such as virtual furniture, buildings and plants, animate objects such as (game) characters and animals, data files such as presentations and documents, signage, etc.

Figure 2A:
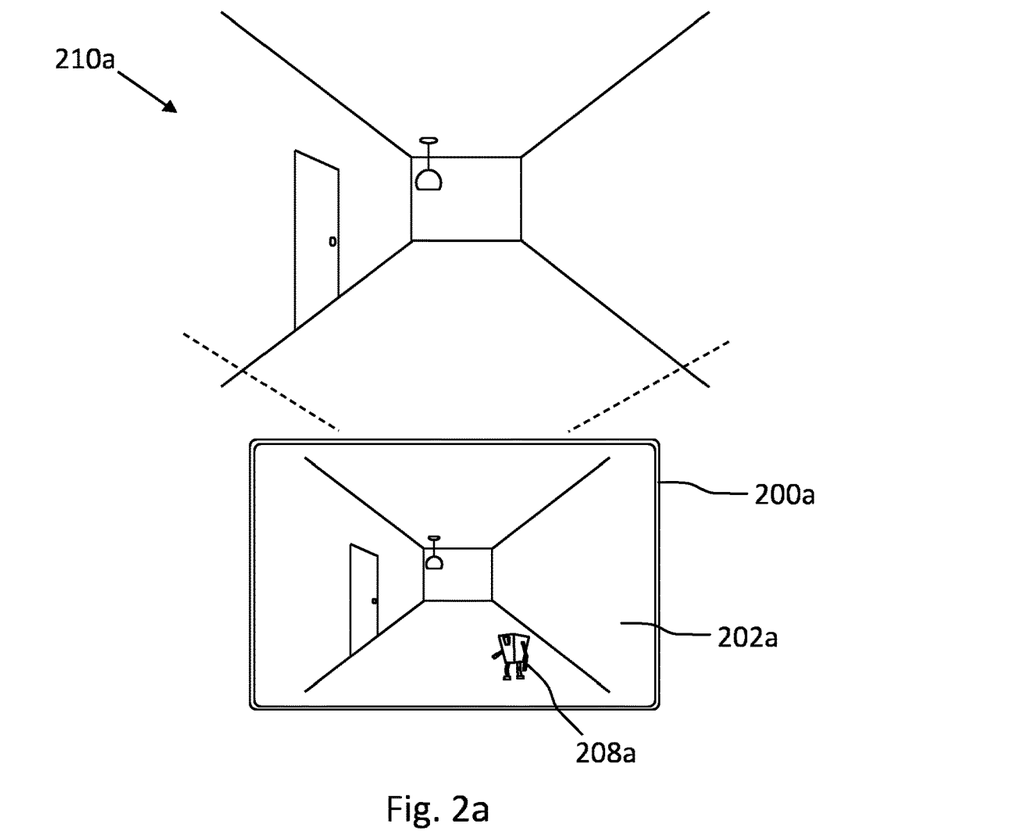
FIGS. 2a and 2b show schematically embodiments of portable device for rendering virtual objects.
Figure 2B:
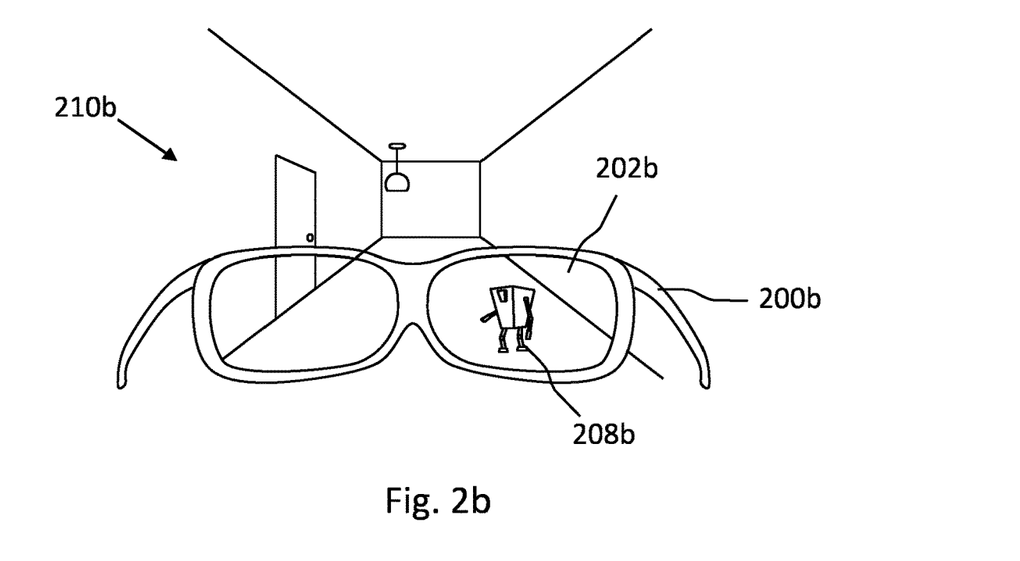

The processor 104 may be configured to render the virtual object as an overlay on top of the physical environment. As illustrated in FIG. 2a, the image rendering device 202a may be a display. The portable device 200a may further comprise an image capturing device (e.g. a camera) configured to capture images. The image capture device may capture images of the physical environment 210a. The processor (not shown in FIG. 2a) may be further configured to render the images captured by the image capture device on the display 202a, and to render the virtual object 208a on the display 202a as an overlay on the images. As illustrated in in FIG. 2b, the portable device 200b may be a pair of smart glasses. The image rendering device 202b may be a display. The portable device 200b may further comprise an image capturing device (e.g. a camera) configured to capture images. The image capture device may capture images of the physical environment 210b. The processor (not shown in FIG. 2b) may be further configured to render the images captured by the image capture device on the display 202b, and to render the virtual object 208b on the display as an overlay on the images. Alternatively, the image rendering device 202b may be a projector configured to project the virtual object 208b on at least one of the glasses of the pair of smart glasses as an overlay on the physical environment 210b. Alternatively, image rendering device 202b may be a projector configured to project the virtual object 208b directly on the retina of the user wearing the pair of smart glasses as an overlay on the physical environment 210b.

The processor 104 may be further configured to compare a future moment in time with the scheduled moments in time to select a future scheduled location corresponding with one of the scheduled moments in time that corresponds with the future moment in time. For example, when referring again to Table 1, the current moment in time may be 08:05 PM. The processor 104 may compare a future moment in time, e.g. 08:10 PM, with the scheduled moments in time of Table 1, and select a future scheduled location, which in this example would be the "Bedroom" location, because this location corresponds with the scheduled moment in time "08:10 PM 08:30 PM" and therewith with the future moment in time 08:10 PM.

The processor 104 may be further configured to provide a notification via the portable device 100 indicative of that the future moment in time is approaching and/or that the virtual object will be rendered on the portable device 100 at the future scheduled location. The notification (e.g. an indicator rendered on the image rendering device 102, a vibration actuated by a vibrator of the portable device 100, turning on an indicator LED on the portable device 100, an audio signal produced by a speaker of the portable device 100, etc.) may notify the user that the future moment in time is approaching and/or that the virtual object will be rendered on the portable device 100 at the future scheduled location.

The processor 104 may be further configured to receive location information (e.g. a set of coordinates of the location of the lighting device 108) indicative of a location of one or more lighting devices. The processor 104 may be further configured to compare the future scheduled location with the locations of the one or more lighting devices, and, if a lighting device is located within a predetermined proximity (e.g. within a predefined range) of the future scheduled location, the processor may change the light output of that lighting device. Additionally or alternatively, the processor 104 may be further configured to compare the current scheduled location with the locations of the one or more lighting devices, and, if a lighting device is located within a predetermined proximity (e.g. within a predefined range) of the current scheduled location, the processor 104 may change the light output of that lighting device. The processor 104 may be configured to generate a lighting control command, and the portable device may further comprise a communication unit configured to communicate the lighting control command to the lighting device in order to change the light output of the lighting device. The lighting control command may comprise control instructions for, for example, blinking the light of the lighting device, changing the color of the lighting device (e.g. from white light to red light), etc. This is beneficial, because it enables a user to see where he or she has to take the portable device 100 in order to see the virtual object on the image rendering device 102.

Additionally, the processor 104 may be configured to control the lighting device such that it emits light comprising an embedded code. The code may be created by any known principle of embedding a code in light, for example by controlling a time-varying, modulated current to the one or more light sources to produce variations in the light output, by modulating the amplitude and/or the duty-cycle of the light pulses, etc. The processor 104 of the portable device 100 may be further configured to (only) render the virtual object if the code has been detected. The code may, for example, be detected by a light detector such as a camera or a photodiode. As a result, a user may see the virtual object only if the portable device has received the code from the lighting device.

The processor 104 may be further configured to receive a mapping of a virtual environment on the physical environment wherein locations in the virtual environment correspond to locations in the physical environment. The processor 104 may receive this mapping from a further device, such as a remote server. Additionally or alternatively, the processor 104 may be further configured to generate the mapping, for example based on images received from an image capturing device (such as a camera, a 3D camera, etc.) and/or based on building information (e.g. a 2D/3D building layout). The processor 104 may apply image processing algorithms to determine locations of objects and the layout of the physical environment (which may, for example, be based on depth information received from a 3D camera/scanner) in order to generate the mapping of the virtual environment on the physical environment. The mapping may, for example, be a mapping of virtual coordinates onto physical coordinates in a 3D space.

Figure 3:
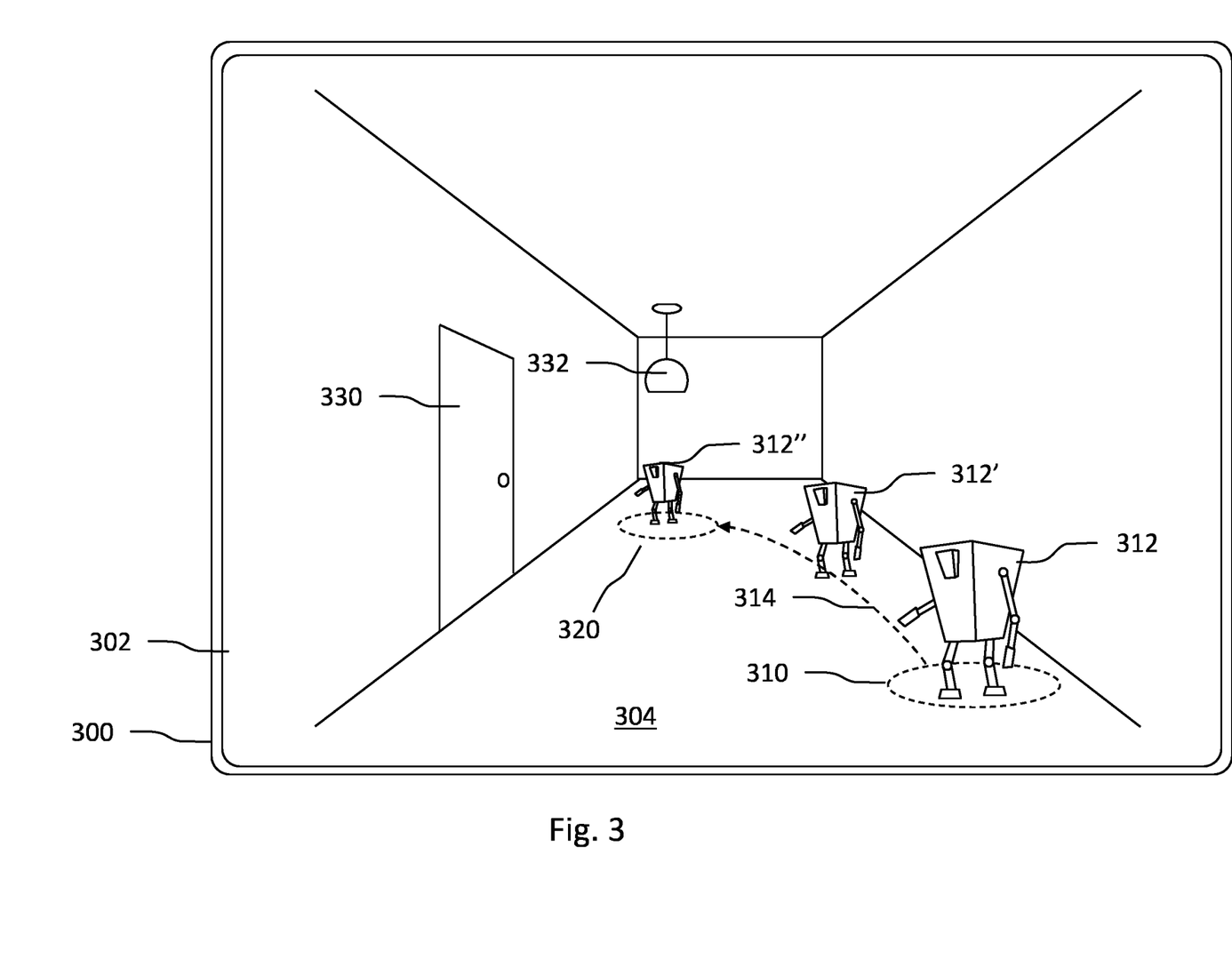
FIG. 3 shows schematically an embodiment of a portable device for rendering a virtual object that moves from a first location to a second location.

FIG. 3 illustrates an embodiment wherein the virtual world has been mapped onto the physical world. FIG. 3 shows a portable device 300 comprising an image rendering device 302 (a display). The portable device 300 may further comprise an image capturing device (e.g. a (depth) camera) configured for capturing images of the physical environment 304. The processor (not shown) of the portable device 300 may be configured to receive a mapping of the virtual world on the physical world. Additionally or alternatively, the processor may be further configured to generate the mapping, for example based on images received from the image capturing device. The processor 104 may apply image processing algorithms to determine locations of objects 330, 332 and the layout of the physical environment 304 (which may, for example, be based on depth information received from a 3D depth camera) in order to generate the mapping of the virtual environment on the physical environment.

The virtual object 312 (in this example a virtual character) may have a virtual location 310 that corresponds with a physical location 310. The virtual object may be rendered on the display 302 when the user points his portable device 300 towards the physical location 310 of the virtual object 312. The virtual object 312 may be rendered as an overlay on top of the physical environment 304 using various known augmented reality (AR) (or virtual reality (VR)) techniques. The virtual location 310 (and therewith the physical location 310) of the virtual object may be determined by a computer program running on a (remote) computing device (e.g. a game server, an AR-content server, etc.). The physical location 310 of the virtual object may, for example, be a GPS location (e.g. a set of coordinates), an (indoor) location relative to an area (e.g. coordinates in a room), etc. The physical locations 310 of one or more virtual objects may be stored in a memory accessible by the processor.

The processor may be further configured to render the virtual object 312 on the image rendering device 302 at a first virtual location 310 in the virtual environment corresponding to a first physical location 310 in the physical environment 304, and to set the virtual object 312, 312', 312" to a movement state, wherein the virtual object 312, 312', 312" moves from the first virtual location 310 to a second virtual location 320 in the virtual environment corresponding to a second physical location 320 in the physical environment 340. The first physical location 310 may be the scheduled location corresponding with the current moment in time, and the second physical location 320 may be the future scheduled location corresponding with the future moment in time. The processor may set the virtual object 312, 312', 312" to the movement state between the current moment in time and the future moment in time. Thus, at the current moment in time (e.g. 09:58 AM), the processor may render the virtual object 312 stationary at the first virtual location 310 (and therewith at the first physical location 310). The processor may access the user schedule and determine that a future moment in time is approaching (e.g. 10:00 AM), the future moment in time corresponding to a future scheduled location (in this example the second physical location 320). The processor may be configured to calculate a path 314 for the virtual object 312, 312', 312" from the first virtual location 310 (and therewith at the first physical location 310) to the second virtual location 310 (and therewith at the second physical location 310). Subsequently, the processor may render a movement of the virtual object 312, 312', 312" from the first virtual location 310 to the second virtual location 310 during the time in between the current moment in time (09:58 AM) and the future moment in time (10:00 AM). This enables a user to see where the virtual object will be accessible (i.e. where it will be rendered). The processor may be further configured to control the light output of lighting device 332, which has a location corresponding to the second physical location 320, to indicate that the virtual object 312, 312', 312" is/will be present at that location.

The processor 104 may be further configured to detect a presence of a physical object located within a predetermined proximity of the portable device 100, and to render the virtual object only when the physical object is present. Examples of physical objects include but are not limited to toys, furniture, people, animals, plants and (building) infrastructure. The processor may, for example, detect the presence of the physical object by analyzing images captured by an image capturing device (e.g. a camera) and detect the physical object in the images. Additionally or alternatively, the portable device may comprise a detection means for detecting (and identifying) the object. Examples of such detection include but are not limited to detection of QR-codes, detection of radio frequency (RF) signals emitted by the physical object, coded light emitted by a light source of the physical object, etc. Additionally, the processor 104 may be configured to render the virtual object on the image rendering device 102 such that the virtual object has a location relative to the physical object. The processor 104 may, for example, identify a physical object in an image captured by an image capturing device and determine a location of the virtual object in the image based on the location of the physical object in the image. Alternatively, the processor 104 may determine a virtual location for the virtual object that corresponds with a physical location of the physical object. The processor may then render the image on a display and render the virtual object at the location relative to the physical object as an overlay on the image.

The processor 104 may be further configured to obtain a plurality of locations of the portable device over a period of time, each location corresponding with a moment in time. The plurality of locations may be detected by the location detector 108. The processor 104 may store the plurality of locations together with the corresponding moments in time in a memory. The processor 104 may be further configured to generate a user schedule based on the plurality of user locations and the corresponding moments in time, and store the generated user schedule in the memory 106, 120. The processor 104 may be configured to detect repetitive user patterns (the user patterns being indicative of the movement of the user between locations at moments in time), and generate the user schedule based on (an average of) these patterns. Additionally or alternatively, the processor 104 may be configured to determine a future location corresponding with a future moment in time by extrapolating the plurality of user locations and the corresponding moments in time. The processor 104 may be configured to detect repetitive user patterns and use past user patterns to predict future user patterns, and therewith the future location corresponding with the future moment in time. The processor 104 may further select a future location of the user based on this prediction, and render the virtual object on the image rendering device 102 of the portable device 100 only if the location of the portable device 100 corresponds with the future location. Additionally, the processor 104 may be configured to continuously monitor relocation of the portable device (and therewith movement of the user), and predict a next location where the portable device 100/user will likely go to based on the movement of the user and based on the detected user patterns. This enables the processor 104 to predict a location where a user will go to, and to select the predicted location and render the virtual object on the image rendering device 102 of the portable device 100 only if the location of the portable device 100 corresponds with the predicted location.

Figure 4:
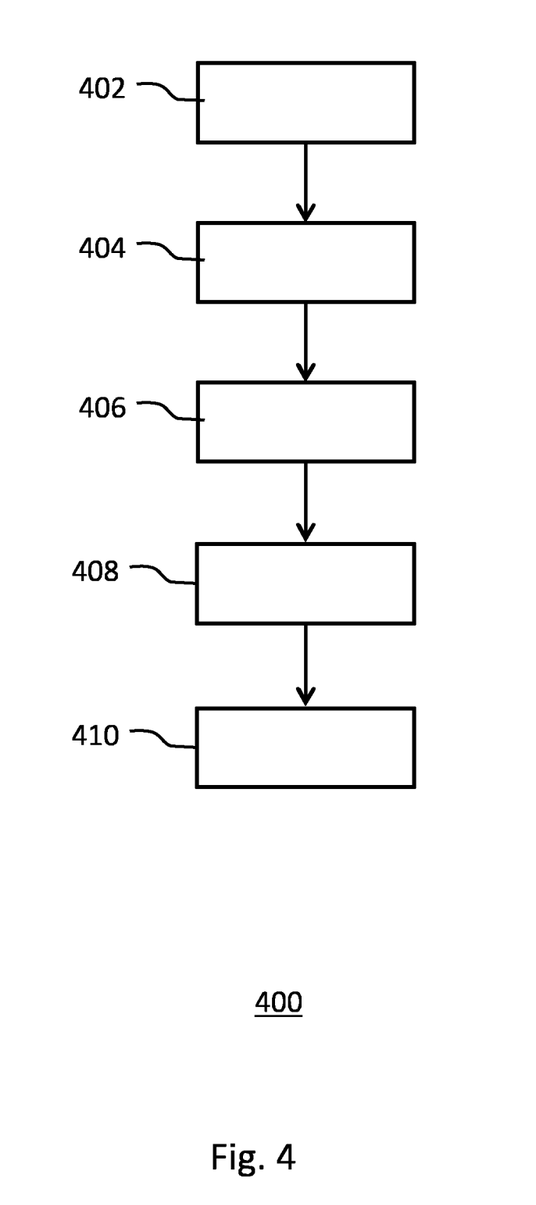
FIG. 4 shows schematically steps of a method of rendering a virtual object on a portable device.

FIG. 4 shows schematically a method 400 according to the invention for rendering a virtual object on a portable device 100. The method 400 comprises accessing 402 a user schedule comprising scheduled locations of a user corresponding with scheduled moments in time. The method 400 further comprises comparing 404 a current moment in time with the scheduled moments in time to select 406 a scheduled location corresponding with one of the scheduled moments in time that corresponds with the current moment in time. The method 400 further comprises obtaining 408 a location of the portable device 100. The method 400 further comprises rendering 410 the virtual object on an image rendering device 102 of the portable device 100 only if the location of the portable device 100 corresponds with the selected scheduled location.

The method 400 may be executed by computer program code of a computer program product when the computer program product is run on a processing unit of a computing device, such as the processor 104 of the portable device 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of rendering a virtual object on a portable device, the method comprising:
   accessing a user schedule comprising scheduled locations of a user corresponding with scheduled moments in time,
   comparing a current moment in time with the scheduled moments in time to select a scheduled location corresponding with one of the scheduled moments in time that corresponds with the current moment in time,
   obtaining a location of the portable device,
   rendering the virtual object on an image rendering device of the portable device as an overlay on a physical environment wherein the portable device is located, only if the location of the portable device corresponds with the selected scheduled location,
   comparing a future moment in time with the scheduled moments in time to select a future scheduled location corresponding with one of the scheduled moments in time that corresponds with the future moment in time, and
   changing a light output of a lighting device located in proximity of the future scheduled location to indicate that the virtual object will be rendered on the portable device at the future scheduled location, wherein the light output is changed by communicating a lighting control command to the lighting device.

2. The method of claim 1, further comprising providing a notification by the portable device indicative of that the future moment in time is approaching and/or that the virtual object will be rendered on the portable device at the future scheduled location.

3. The method of claim 1, further comprising:
   receiving a mapping of a virtual environment on the physical environment wherein locations in the virtual environment correspond to locations in the physical environment,
   rendering the virtual object on the image rendering device at a first virtual location in the virtual environment corresponding to a first physical location in the physical environment, and
   setting the virtual object to a movement state, wherein the virtual object moves from the first virtual location to a second virtual location in the virtual environment corresponding to a second physical location in the physical environment,
   wherein the first physical location is the scheduled location corresponding with the current moment in time, and wherein the second physical location is the future scheduled location corresponding with the future moment in time.

4. The method of claim 3, wherein the virtual object is set to the movement state between the current moment in time and the future moment in time.

5. The method of claim 1, further comprising detecting a presence of a physical object located within a predetermined proximity of the portable device wherein the rendering of the virtual object occurs only when the physical object is present.

6. The method of claim 5, wherein the virtual object is rendered on the image rendering device having a location relative to the physical object.

7. The method of claim 1, further comprising:
   obtaining a plurality of locations of the portable device over a period of time, each location corresponding with a moment in time, and at least one of:
   generating the user schedule based on the plurality of user locations and the corresponding moments in time and storing the user schedule in the memory, and
   determining a future location corresponding with a future moment in time by extrapolating the plurality of user locations and the corresponding moments in time.

8. A computer program product for a computing device, the computer program product comprising computer program code to perform the method of claim 1 when the computer program product is run on a processing unit of the computing device.

9. A portable device for rendering a virtual object, the portable device comprising:
   an image rendering device configured to render virtual objects,
   a processor configured to access a memory storing a user schedule comprising scheduled locations of a user corresponding with scheduled moments in time, and to compare a current moment in time with the scheduled moments in time to select a scheduled location corresponding with one of the scheduled moments in time that corresponds with the current moment in time, and to obtain a location of the portable device, and to render the virtual object on the image rendering device as an overlay on a physical environment wherein the portable device is located, only if the location of the portable device corresponds with the selected scheduled location, and to compare a future moment in time with the scheduled moments in time to select a future scheduled location corresponding with one of the scheduled moments in time that corresponds with the future moment in time, and to change a light output of a lighting device located in proximity of the future scheduled location to indicate that the virtual object will be rendered on the portable device at the future scheduled location, wherein the light output is changed by communicating a lighting control command to the lighting device.

10. The portable device of claim 9, wherein the image rendering device is a display, and wherein the portable device further comprises an image capturing device configured to capture images, and wherein the processor is further configured to render the images captured by the image capture device on the display, and to render the virtual object on the display as an overlay on the images.

11. The portable device of claim 9, wherein the portable device is a pair of smart glasses, and wherein the image rendering device is a projector configured to project the virtual object on at least one of the glasses of the pair of smart glasses as an overlay on a physical environment wherein the portable device is located.

12. The portable device of claim 9 wherein the portable device further comprises a location detector configured to detect the location of the portable device.

\* \* \* \* \*